Patented May 17, 1938

2,117,631

UNITED STATES PATENT OFFICE 2,117,631

PROCESS OF SOFTENING WATER

Erich Seyb, Leuna, Germany, assignor to I. G. Farbenindustrie Aktiengesellschaft, Frankfort-on-the-Main, Germany No Drawing. Application June 12, 1936, Serial No. 84,899. In Germany June 15, 1935

1 Claim. (Cl. 210—23)

The present invention relates to a process of softening water.

It has already been proposed to soften water having sulphate hardness by an addition of barium compounds (barium hydroxide or barium carbonate). This method of working, by reason of the precipitation of solid barium sulphate and calcium carbonate, at the same time reduces the total content of salt of the water, which fact is of appreciable advantage in the operation of high-efficiency steam generators. Barium hydroxide, however, is comparatively costly. Treating the water with barium carbonate, though cheaper, is attended with the drawback that the gypsum hardness is for its major part converted into carbonate hardness for the reason that the carbon dioxide contained in the water leads to the formation of hydrocarbonate. The said carbonate hardness must be eliminated again by the addition of lime. In both cases, moreover, subsequent softening by means of phosphate and the like is necessary. The subsequent softening furthermore implies a certain alkalinity of the water which in high-efficiency steam generators leads to foaming and priming.

It has also been proposed to soften water by means of a base-exchanger which contains exchangeable hydrogen ions. While it is possible by this manner to completely eliminate the carbonate hardness, the process is attended with the drawback that the gypsum contained in the water leads to the formation of free sulphuric acid which necessitates a subsequent neutralization of the water by means of alkali.

I have now found that the softening of water which contains appreciable amounts of gypsum hardness and only a small amount, if any, of chlorides of alkaline earth metals is advantageously carried through by adding barium carbonate to the water to be softened, separating the solid barium sulphate and calcium carbonate precipitated as well as any excess of barium carbonate from the water, e. g. by filtering and then treating the water with a base-exchanger having exchangeable hydrogen ions.

By the addition of barium carbonate to the water the gypsum contained in the water is completely converted into barium sulphate and calcium carbonate. Since, as is well known, the reaction between gypsum in a dissolved state and solid barium carbonate is promoted by the presence of free carbon dioxide it may be advisable in circumstances, in the case of water poor in carbon dioxide, to add free carbon dioxide before, during or after the addition of the barium carbonate. From the water barium sulphate is precipitated completely while calcium carbonate is precipitated only partially, part thereof being kept in solution by the free carbon dioxide contained in the water. The solid salts precipitated are removed from the water in the usual manner, as for example by sedimentation and subsequent filtration. The water thus obtained which no longer contains sulphate hardness, but only carbonate hardness is subjected to a treatment with a base-exchanger having exchangeable hydrogen ions. Any substances provoking the hardness of water still present may thus be removed from the water without their place being taken by other salts. The free carbon dioxide still contained in the water is later removed by the usual degasification of the water. When the water originally employed as starting material contains a small amount of chlorides of alkaline earth metals, the softened water will contain a correspondingly small amount of free hydrochloric acid which may readily be removed, if desired, in known manner by neutralization with caustic soda solution.

What I claim is:—

A process of softening water containing appreciable amounts of gypsum hardness and slight amounts of chlorides of alkaline earth metals comprising adding barium carbonate to the water, separating the solid substances from the water, treating the water with a base-exchanger having exchangeable hydrogen ions and neutralizing the hydrochloric acid still contained in the water with caustic soda after degasifying the water.

ERICH SEYB.